Patented Sept. 1, 1942

2,294,616

UNITED STATES PATENT OFFICE 2,294,616

DEGRADATION PRODUCTS CONTAINING CARBOXYL GROUPS FROM COMPOUNDS OF THE ESTRANE SERIES CONTAINING AT LEAST ONE DOUBLE BOND IN RING B

Walter Hohlweg, Hohen-Neuendorf, near Berlin, and Hans Herloff Inhoffen, Berlin-Wilmersdorf, Germany, assignors to Schering Corporation, Bloomfield, N. J., a corporation of New Jersey No Drawing. Application January 19, 1940, Serial No. 314,724. In Germany January 19, 1939

11 Claims. (Cl. 260—397.1)

This invention relates to degradation products of compounds of the estrane series and more particularly to degradation products containing carboxyl groups and a method of making them, and is a continuation in part of our copending application Ser. No. 245,594.

In U. S. application Ser. No. 245,594 there is described the oxidation of 17-alcohols of the estrane series, for example, of estradiol, to physiologically active degradation products containing carboxyl groups.

Now we have found that by oxidation, especially by fusion with alkali, of 17-ketones of the estrane series which are unsaturated in ring B, for example, of equiline or equilenine, likewise degradation products are obtained which contain carboxyl groups, ring D being ruptured and which possess a far stronger physiological activity than those oxidation products which are obtained by oxidation of 17-ketones or 17-alcohols of the estrane series which are saturated in ring B, for example, of estrone according to U. S. Patent 2,069,096 and estradiol according to the above mentioned application.

The oxidation is carried out in the same manner as described in copending application Ser. No. 245,594.

Preferably the phenolic hydroxyl group is protected against oxidation by conversion into a group that is reconvertable into a hydroxy group, such as an ester, ether, halogen or the like.

The following examples illustrate the invention without, however, limiting the same to them.

Example 1

1 g. of equiline is heated in a silver crucible with 7 cc. of water and 50 g. of potassium hydroxide for 1¼ hours to 275° C. After cooling, the reaction mixture is dissolved in water, the aqueous solution is filtered and carbon dioxide is introduced into the solution. After filtration the clear solution is acidified with hydrochloric acid, the precipitate removed by suction, washed with water, and dried. The melting point of this product is about 100° C. Yield: 200 mg. Even 0.001 mg. of this product is active on spayed rats when administered perorally. The 200 mg. obtained correspond therefore to 200,000 rat units on oral application.

Example 2

1 g. of equilenine is heated in a silver crucible with 7 cc. of water and 50 g. of potassium hydroxide for one hour. After cooling, the reaction product is worked up according to Example 1. The product thus obtained has a melting point of 120–122° C. Yield: 280 mg. Tested as above it shows a physiological activity on peroral administration of 0.005 mg./rat unit. In all 56,000 rat units were recovered.

Of course other oxidation methods can be used likewise, such as oxidation with potassium permanganate, chromium trioxide and others, as are known to those skilled in the art. Many other changes and variations in the reaction conditions, the oxidizing agents used, the temperature and so forth may be made by those skilled in the art in accordance with the principles set forth herein and in the claims annexed hereto.

What we claim is:

1. Process for the manufacture of degradation products containing carboxyl groups from 17-keto compounds of the estrane series, unsaturated in ring B of the molecule, wherein the starting material is subjected to the action of an oxidizing agent until a cyclic carboxylic compound wherein the D ring has been ruptured is produced.

2. Process for the manufacture of degradation products containing carboxyl groups from 17-keto compounds of the estrane series, comprising subjecting equiline to the action of an oxidizing agent.

3. Process for the manufacture of degradation products containing carboxyl groups from 17-keto compounds of the estrane series, comprising subjecting equilenine to the action of an oxidizing agent.

4. Process according to claim 1, wherein the starting material is subjected to fusion with an alkali metal hydroxide.

5. Process according to claim 1, wherein carboxylic acids are isolated from the oxidation product.

6. Oxidation products of 17-keto-compounds of the estrane series unsaturated in ring B, having an oral activity substantially higher than that of the starting material.

7. Oxidation product of equiline containing at least one carboxylic group, melting at about 100° C. and showing estrogenic activity when administered on the spayed rat.

8. Oxidation product of equilenine containing at least one carboxylic group, melting at 120–122° C. and showing estrogenic activity on the spayed rat when administered internally.

9. Oxidation product of equiline wherein three of the four rings of the original unoxidized equiline are present and containing at least one carboxyl group and a member of the class consisting of a phenolic hydroxyl group and groups capable of being transformed into the hydroxyl group, said oxidation product having an oral estrogenic activity substantially higher than that of equiline.

10. Oxidation products of equilenine, wherein three of the four rings of the original unoxidized equilenine are present and containing at least one carboxyl group and a member of the class consisting of a phenolic hydroxyl group and groups capable of being transformed into the hydroxyl group, said oxidation product having an oral estrogenic activity substantially higher than that of equilenine.

11. Process for the manufacture of degradation products containing carboxyl groups from 17-keto compounds of the estrane series, unsaturated in ring B of the molecule, comprising subjecting the starting material to the action of an oxidizing agent capable of rupturing ring D with formation of a carboxyl group.

WALTER HOHLWEG.
HANS HERLOFF INHOFFEN.